United States Patent
O'Dea et al.

(10) Patent No.: US 10,328,935 B2
(45) Date of Patent: Jun. 25, 2019

(54) ADAPTIVE CRUISE CONTROL SYSTEM AND METHOD OF OPERATING THE SAME

(71) Applicant: GM GLOBAL TECHNOLOGY OPERATIONS LLC, Detroit, MI (US)

(72) Inventors: Kevin A. O'Dea, Ann Arbor, MI (US); Akshat Rajvanshi, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/176,712

(22) Filed: Jun. 8, 2016

(65) Prior Publication Data

US 2017/0355368 A1 Dec. 14, 2017

(51) Int. Cl.
*B60W 30/14* (2006.01)
*G05D 1/00* (2006.01)
*G05D 1/02* (2006.01)

(52) U.S. Cl.
CPC .......... *B60W 30/143* (2013.01); *G05D 1/0088* (2013.01); *G05D 1/0223* (2013.01); *G05D 2201/0213* (2013.01)

(58) Field of Classification Search
CPC .......................... B60W 30/143; G05D 1/0088
USPC .......................................................... 701/23
See application file for complete search history.

(56) References Cited

U.S. PATENT DOCUMENTS

| | | | |
|---|---|---|---|
| 6,370,475 B1 * | 4/2002 | Breed | B60N 2/2863 340/436 |
| 8,378,805 B2 * | 2/2013 | Au | B60Q 1/34 340/465 |
| 9,074,536 B2 * | 7/2015 | Schwindt | F02D 28/00 |
| 9,555,801 B2 * | 1/2017 | Yester | B60W 30/09 |
| 9,682,725 B2 * | 6/2017 | Yamaoka | B62D 15/0255 |
| 9,764,689 B2 * | 9/2017 | Burke | B60Q 9/008 |
| 9,802,614 B1 * | 10/2017 | Yoon | H04W 4/70 |
| 9,884,625 B2 * | 2/2018 | Taira | B60W 30/18163 |
| 9,884,645 B2 * | 2/2018 | Fujii | B60W 10/20 |
| 9,925,987 B1 * | 3/2018 | Nguyen | B60W 40/09 |
| 10,093,315 B2 * | 10/2018 | Nath | B60W 30/12 |

(Continued)

FOREIGN PATENT DOCUMENTS

WO WO2015134417 A 9/2015

OTHER PUBLICATIONS

Chinese Office Action for Application No. 201710398836.5 dated Apr. 3, 2019; 8 pages.

*Primary Examiner* — Anne M Antonucci
*Assistant Examiner* — James E Stroud
(74) *Attorney, Agent, or Firm* — Reising Ethington, P.C.

(57) ABSTRACT

A system and method are provided for operating an autonomous or semi-autonomous host vehicle. The method includes receiving data measured from a plurality of sensors, wherein the measured data relates to one or more target vehicles in the host vehicle's field of view, calculating a desired speed command based on a driver-selected set-speed and the measured data, detecting initiation of a host vehicle lane change to a desired adjacent lane, and in response to initiation of the lane change, selecting an acceleration profile based on at least one set of operating conditions, calculating a modified speed command by adjusting the desired speed command according to the selected acceleration profile; and controlling a host vehicle speed based on the modified speed command.

20 Claims, 3 Drawing Sheets

(56) References Cited

U.S. PATENT DOCUMENTS

| | | | | |
|---|---|---|---|---|
| 2003/0025597 A1* | 2/2003 | Schofield | ............... | B60Q 1/346 |
| | | | | 340/435 |
| 2010/0253594 A1* | 10/2010 | Szczerba | ............... | G01S 13/723 |
| | | | | 345/7 |
| 2012/0209492 A1* | 8/2012 | Choi | ..................... | B60W 30/16 |
| | | | | 701/96 |
| 2014/0074356 A1* | 3/2014 | Bone | ..................... | G08G 1/167 |
| | | | | 701/41 |
| 2016/0379486 A1* | 12/2016 | Taylor | .................. | G08G 1/0141 |
| | | | | 340/905 |
| 2017/0015318 A1* | 1/2017 | Scofield | ............... | G08G 1/0112 |
| 2017/0160745 A1* | 6/2017 | Lauffer | ................ | G01S 13/931 |

* cited by examiner

ADAPTIVE CRUISE CONTROL SYSTEM AND METHOD OF OPERATING THE SAME

FIELD

The present invention generally relates to cruise control systems for vehicles and, more particularly, to an adaptive cruise control system that modifies the host vehicle's speed in response to conditions associated with an anticipated lane change.

BACKGROUND

An adaptive cruise control system—sometimes called an autonomous, active or intelligent cruise control system—is similar to a traditional cruise control system, but uses additional sensing equipment to detect other objects, e.g., a target vehicle in front of, and in the same lane as, the host vehicle. For example, when a host vehicle operator sets the vehicle speed to 60 miles per hour ("mph") under control of the adaptive cruise control system, and the host vehicle approaches a slower-moving target vehicle in the same driving lane, the adaptive cruise control system causes the vehicle to slow down. The adaptive cruise control system uses throttle and brake controls to first reduce the speed of the host vehicle, and then controls the speed of the host vehicle to maintain a particular distance between the host vehicle and the target vehicle. This distance (i.e., the gap) may be based on user selection, sensed weather conditions, sensed road conditions, and other factors. The adaptive cruise control system controls the speed of the host vehicle to be at the lesser of: 1) the speed necessary to maintain the gap; and 2) the user-set speed. Certain driving maneuvers, such as changing lanes, may affect the adaptive cruise control system's calculation of the host vehicle's speed. For example, as the vehicle operator executes a lane change by turning the steering wheel and changing the host vehicle's position, the vehicle sensors may detect that the previously tracked target vehicle no longer impedes the host vehicle's path, and thus, the adaptive cruise control system accelerates the host vehicle speed to reach the user-set speed. This acceleration, however, is not initiated until the target vehicle is no longer in the host vehicle's path trajectory. The delay in initiating the acceleration may cause an undesirable delay in executing and completing the lane change.

SUMMARY

According to one embodiment, there is provided a system and method for operating an autonomous or semi-autonomous host vehicle. The method includes receiving data measured from a plurality of sensors, wherein the measured data relates to one or more target vehicles in the host vehicle's field of view, calculating a desired speed command based on a driver-selected set-speed and the measured data, detecting initiation of a host vehicle lane change from a current lane to a desired adjacent lane, and in response to initiation of the lane change, selecting an acceleration profile based on at least one set of operating conditions, calculating a modified speed command by adjusting the desired speed command according to the selected acceleration profile; and controlling a host vehicle speed based on the modified speed command.

According to one embodiment, there is provided a system and method for operating an autonomous or semi-autonomous host vehicle. The method includes receiving data measured from a plurality of sensors, wherein the measured data relates to one or more target vehicles in the host vehicle's field of view, receiving a desired speed command based on a driver-selected set-speed and the measured data, detecting a host vehicle lane change from a current lane to an adjacent lane based on an activation of a host vehicle turn signal, determining a relative speed between the host vehicle and a target vehicle in the adjacent lane, selecting a positive or a negative acceleration profile based on the relative speed and a plurality of operating conditions, calculating a modified speed command by adjusting the desired speed command according to the selected acceleration profile, and controlling a host vehicle response based on the modified speed command.

According to another embodiment, there is provided a control system for a vehicle. The system includes a plurality of vehicle sensors configured to measure data relating to one or more target vehicles in the host vehicle's field of view and an adaptive cruise control system configured to receive the measured data relating to the one or more target vehicle, calculate a desired speed command based on a driver-selected set-speed and the measured data, detect initiation of a host vehicle lane change from a current lane to a desired adjacent lane, in response to initiation of the lane change, select an acceleration profile based on at least one set of operating conditions, calculate a modified speed command by adjusting the desired speed command according to the selected acceleration profile, and control the host vehicle speed based on the modified speed command.

DRAWINGS

Preferred exemplary embodiments will hereinafter be described in conjunction with the appended drawings, wherein like designations denote like elements, and wherein.

Figure 3:
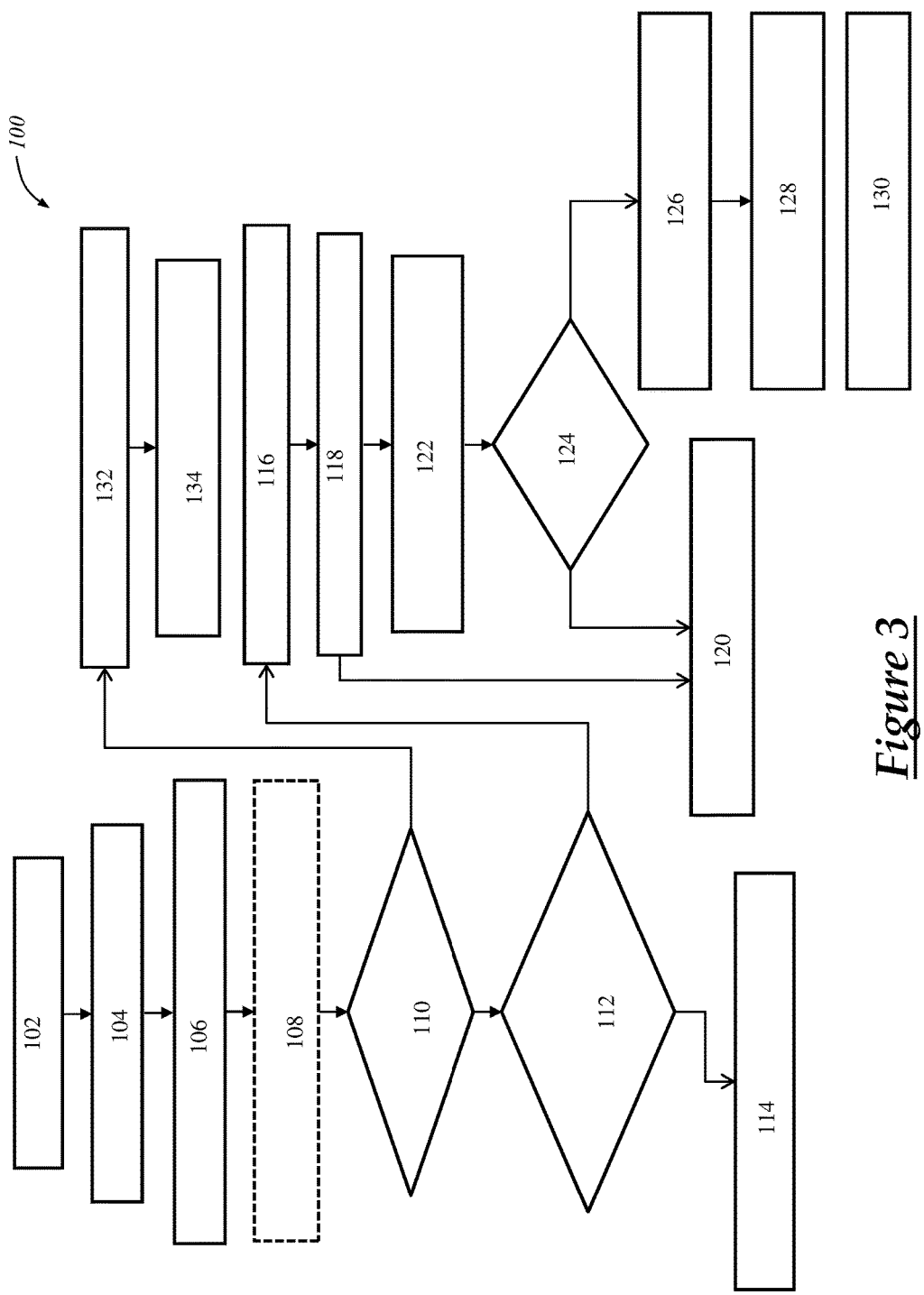

FIG. 3 a flow chart illustrating an exemplary embodiment of the method disclosed herein.

DESCRIPTION

The system and method described below are directed to an adaptive cruise control system configured to implement a method that modifies the host vehicle's speed in response to conditions associated with an anticipated lane change. In one embodiment, the method implements this modification by adjusting a desired speed request prior to transmission of the request to an engine control module. The desired speed request may be calculated according to conventional adaptive cruise control methods based upon various input parameters. The disclosed method detects the anticipated lane change based on the activation of a driver-initiated turn signal, and then determines whether one or more sets of operating conditions are met. Depending on which conditions are satisfied, the vehicle speed request is modified according to one of a plurality of condition profiles, wherein each profile relates to a supplemental gain, torque or acceleration request that adjusts the vehicle speed request up or down to facilitate the efficiency of the lane change. This supplemental speed request adjusts the speed of the host vehicle beyond what is typical for the normal operation of the adaptive cruise control system in an attempt to mimic the anticipatory actions of a human driver during a lane change, and thus increasing the effectiveness of the adaptive cruise control system.

System—

Figure 1:
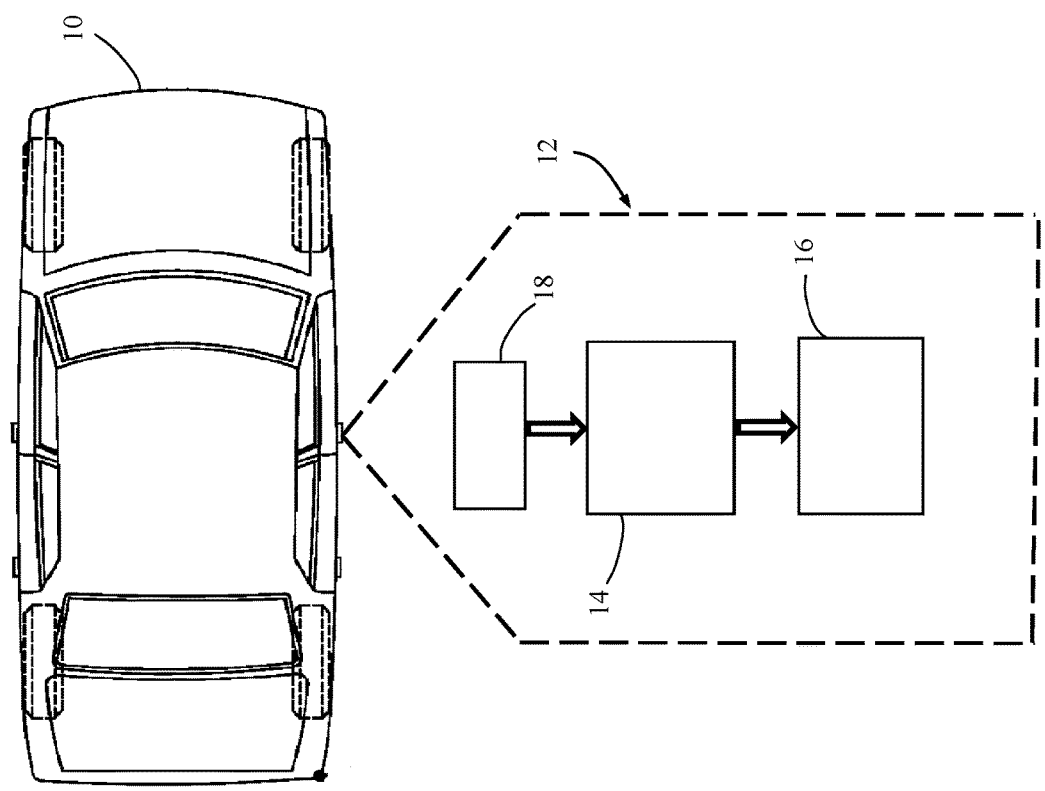
FIG. 1 is a block diagram depicting an embodiment of a communications system that is capable of utilizing the method disclosed herein.

With reference to FIG. 1, there is shown an exemplary embodiment of a host vehicle 10 having a communications system 12. Host vehicle 10 is depicted in the illustrated embodiment as a passenger car, but it should be appreciated that any other vehicle including motorcycles, trucks, sports utility vehicles (SUVs), recreational vehicles (RVs), semi-trucks, etc. can also be used. Communications system 12 includes an adaptive cruise control (ACC) system implemented by an intelligent autonomous control (IAC) module 14, and any number of different hardware components and other devices, including an engine control module 16 and various types of sensors 18. For example, the system and method disclosed herein may be used with different types of autonomous and/or semi-autonomous driving systems and may include any control modules or units within the host vehicle 10 that can perform autonomous, semi-autonomous and/or other automated driving actions in response to control signals from system 12. "Automated driving action," as used herein, broadly means any driving-related action or function that is automatically taken by the host vehicle 10 without driver request and includes actions falling within levels 1-4 of the National Highway Traffic Safety Administration (NHTSA) classification system.

Sensors 18 may include, without limitation, vehicle mounted sensors that are used to scan, examine, evaluate, etc. an area in front of and off to the side of the host vehicle 10. According to the non-limiting example in FIG. 1, vehicle mounted sensors 18 include different types of cameras, and can be mounted in any suitable forward and/or sideward looking position and orientation. Sensors 18 also include forward-looking object detection sensors to monitor the surrounding environment. These sensors include, without limitation, RADAR systems, LIDAR systems, near-field sensing systems, camera and video-recognition systems, or any other type of sensing system capable of performing the functions described. Accordingly, sensors 18 may comprise a variety of sub-components distributed throughout the vehicle 10 to perform the described functions.

Figure 2:
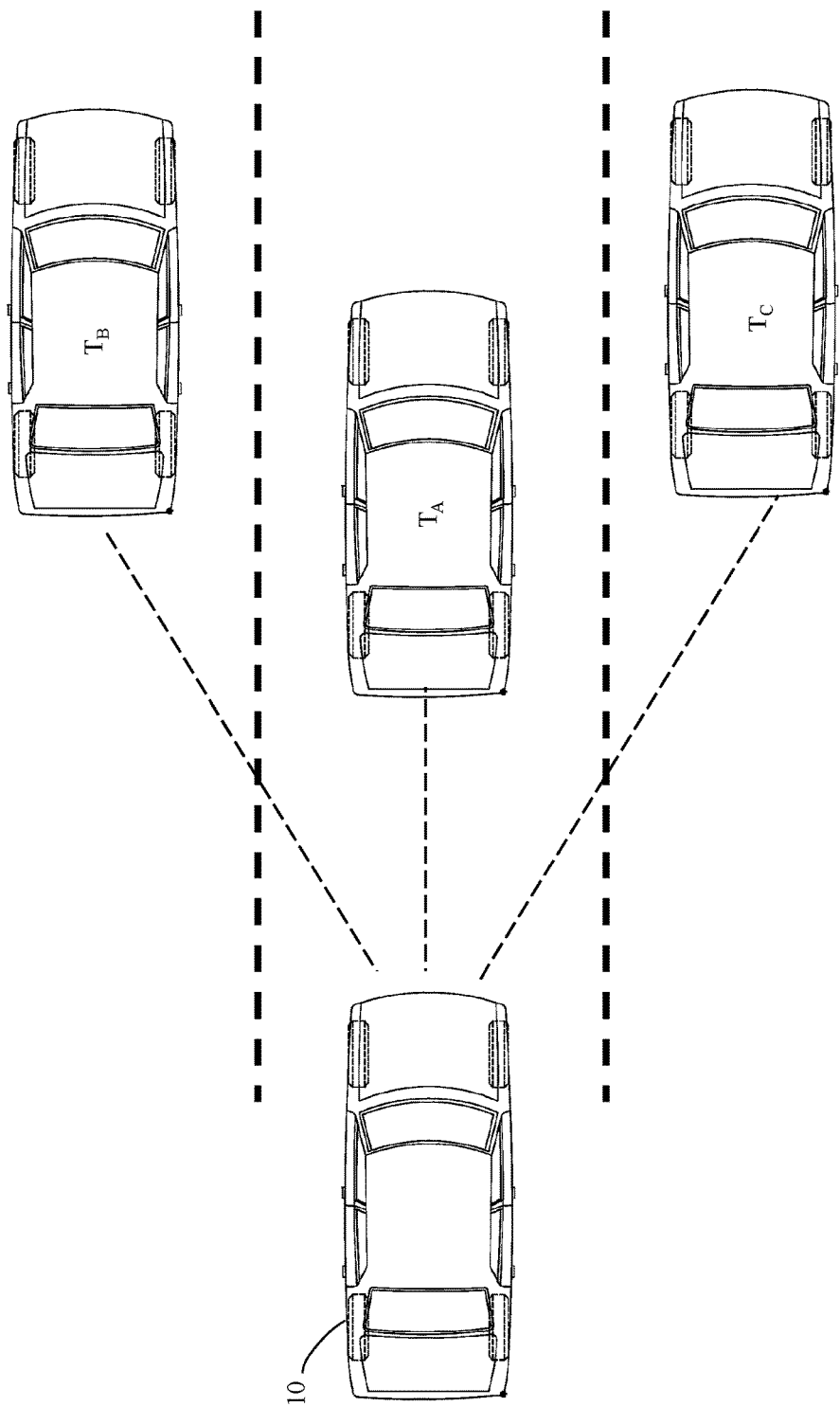
FIG. 2 illustrates a host vehicle in relation to three target vehicles.

In one embodiment, sensors 18 detect objects in the host vehicle's 10 field-of-view, such as the arrangement shown in FIG. 2, wherein there are three target vehicles $T_A$, $T_B$, and $T_C$ within the field of view of the host vehicle. One of ordinary skill in the art understands that the number of target vehicles shown is exemplary and is only provided for purposes of explanation. However, the system disclosed herein has the capability to monitor any number of vehicles or other objects within the host vehicle's field of view.

In addition to detecting the presence of objects and other vehicles, sensors 18 can also determine the speed and/or acceleration of target vehicles $T_A$, $T_B$, and $T_C$, either objectively or relative to the host vehicle 10, and can determine the distance between the host vehicle 10 and the target vehicles $T_A$, $T_B$, and $T_C$. Together with the speed and/or acceleration of the target vehicles $T_A$, $T_B$, and $T_C$ relative to the host vehicle 10, the system can then determine a time gap between the vehicle 10 and the target vehicles $T_A$, $T_B$, and $T_C$. The time gap is the estimated amount of time between the rear of a traveling object ahead of the host vehicle 10 and the front of the host vehicle 10, assuming current vehicle speeds. Thus, a time gap of five seconds indicates that if the traveling object were to pass a particular position on the road, five seconds after the rear of the object was at the position, the front of the host vehicle 10 would reach the position. For each target vehicle, sensors 18 may also determine the driving lane relevant to the host vehicle 10, longitudinal and lateral ranges and range rates (i.e., rate at which the longitudinal and lateral ranges are changing), turning and brake light behavior, and speed relevant to surrounding traffic and road speed, to cite a few possibilities.

In certain embodiments, the sensors 18 are part of a module and can perform both sensing and calculation operations internally, while others can provide information and readings to other components of the vehicle 10, including the IAC module 14. In such embodiments, the IAC 14, or other component(s) can perform operations to determine the time gap and other aspects of range information independently or redundantly. Additional sensors may be used to further evaluate the area surrounding the host vehicle 10, including areas on the side and behind the host vehicle. Other known sensors and sensing techniques may be used in addition to or in lieu of those described above, as the present system and method are not limited to any particular sensor type.

IAC module 14 may communicate with sensors 18, ECM 16, and/or any other components, devices, modules, systems, etc. on the host vehicle 10 (e.g., a brake control module), and may be used to carry out some, most, or even all of the electronic instructions or steps that help make up the present method described herein. The IAC module 14 can be any type of device capable of processing electronic instructions and may include one or more processing devices that include processors, microprocessors, microcontrollers, host processors, controllers, vehicle communication processors, and application specific integrated circuits (ASICs), to name a few possibilities. The IAC module 14 can execute various types of digitally-stored instructions, such as software or firmware programs stored in a memory device, which enables the control of various vehicle functions. Moreover, depending on the particular embodiment, the IAC module 14 may be a stand-alone electronic controller (e.g., a pre-packaged sensor controller that incorporates both sensors and controller into a single package, an object detection controller, a safety controller, etc.), may be incorporated or included within another vehicle electronic module (e.g., automated driving control module, active safety control module, brake control module, steering control module, engine control module, adaptive cruise control module, etc.), or may be part of a larger network or system (e.g., automated driving system, lane departure warning system, active safety system, traction control system (TCS), electronic stability control (ESC) system, antilock brake system (ABS), etc.), to name a few possibilities. Accordingly, the IAC module 14 is not limited to any one particular embodiment or arrangement and may be used by the present method to detect and/or track target vehicles within the host vehicle's field of view.

In one embodiment, the IAC module 14 captures or gathers data measured from sensors 18 for each target vehicle $T_A$, $T_B$, and $T_C$, and stores that data into one or more databases. Data and information from other sensors and devices located throughout the vehicle may be used as well. Each database maintains a buffer consisting of data collected over a predetermined period of time (e.g., 300 seconds), as long as the target vehicle(s) stays in the host vehicle's field of view. The database, or just a portion thereof, can be implemented or maintained in the form of an electronic data structure, as is understood in the art.

The IAC module 14 and the ECM 16, which in one implementation is a powertrain control module, cooperate to control the vehicle powertrain. In one embodiment, the vehicle powertrain includes an internal combustion engine that develops torque to drive the powertrain in response to a request from the ECM 16. The amount of torque to the engine is established by one or more actuators that control at least one of fuel, ignition, residual exhaust gas or exhaust recirculation (EGR), number of cylinders firing, and air flow. It should be appreciated that the engine may be a diesel or any other suitable type of engine; however, the fuel amount, injection timing, residual exhaust gas or EGR, and turbo boost could be adjusted to control the amount of torque. For example, EGR and boost may control the air flow indirectly by displacing air with exhaust gas in a cylinder charge. The powertrain may also include an electric motor that provides torque in accordance with a torque command. The torque of electric motor can be combined with the torque of the engine to provide power for the powertrain, such as in a hybrid vehicle. In a different embodiment, the present method is used in the context of an electric vehicle that has no engine at all. Thus, application of the method and system described herein is potentially available for traditional vehicles with an engine, hybrid vehicles, as well as electric vehicles.

Traditionally, an adaptive cruise control system also includes a calibration file, which is a setup file that defines the commands given to the actuating vehicle control modules such as the ECM 16, and others such as a steering control module and a brake control module. The commands govern the adaptive cruise control system and include a desired speed request that is determined based on input parameters such as the host vehicle speed, target vehicle speed, target vehicle range and range rate, weather and road conditions, etc. Depending on the input parameters, the desired speed request may be configured to accelerate or decelerate the host vehicle 10. The desired speed request may also be configured to maintain the current speed of the host vehicle 10. One of ordinary skill in the art further appreciates that desired speed request may take many forms and may be referred to in different ways. For example, the desired speed request may be in the form a torque request (positive or negative) or in the form of an acceleration request (positive or negative).

Method—

FIG. 3 illustrates a method 100 for controlling an adaptive cruise control system using the system described above with respect to FIG. 1. It should be understood that the steps of the method 100 are not necessarily presented in any particular order and that performance of some or all the steps in an alternative order is possible and is contemplated. The method 100 begins at 102, by measuring and acquiring data from the plurality of vehicle sensors 18. The sensors 18 gather data relating to any target vehicles that are in the host vehicle's 10 field of view. The sensors 18 are configured to detect a variety of parameters including a driving lane of each target vehicle relative to the host vehicle, longitudinal and lateral ranges and range rates between the host vehicle and each target vehicle, the frequency of turning and brake lights for each target vehicle, and the speed and/or acceleration of each target vehicle relative to surrounding traffic and road speed. Other vehicle data (e.g., host vehicle speed and acceleration, etc.) may be gathered as well.

At step 104, a desired vehicle speed command (e.g. a desired speed request) is determined based on the received data, various control parameters associated with the adaptive cruise control system, and a driver-selected vehicle speed set-point. The desired vehicle speed command reflects the vehicle speed necessary to achieve and/or maintain, if possible, the driver-selected vehicle speed set-point. If the driver-selected vehicle speed set-point is unattainable due to, for example, a slower moving target vehicle traveling in front of, and in the same lane as the host vehicle 10, then the desired vehicle speed command reflects the maximum available host vehicle speed taking into consideration various control parameter settings such as the time gap described above. One of ordinary skill in the art appreciates that the nature of the desired vehicle speed command may vary depending on the vehicle drive system. For example, the desired vehicle speed command may be, without limitation, a torque request or an acceleration request and may be a positive or negative value to reflect, respectively, an increase or decrease in the desired vehicle speed. The adaptive cruise control system continually updates the desired vehicle speed command to reflect changes in the host vehicle 10 environment. In some embodiments, the desired vehicle speed command is updated at every execution cycle, which in one non-limiting example may be 40 msec. In a traditional adaptive cruise control system, the desired vehicle speed command is sent to the ECM. Under certain conditions, however, the method disclosed herein modifies or adjusts the desired vehicle speed command prior to transmission to ECM 16. In one embodiment, the desired vehicle speed command may be adjusted or modified by appending other data to the command.

At step 106, the method determines whether a turn signal indicator has been activated according to known methods. The turn signal indicator may be driver-initiated using a turn switch or button on the vehicle steering column or by engaging a traditional stalk extending from the steering column, but other forms form of initiation are also contemplated and within the scope of the present disclosure. The turn signal indicates a driver's intention to change lanes by moving into an adjacent left-hand or right-hand lane. In a different embodiment, the method may detect a driver's intention to change lanes not by activation of a turn signal, but by lateral movement of the host vehicle towards one of the adjacent lanes (e.g., lateral consistent or monotonic movement).

In one embodiment, upon receipt of the turn signal indicator in step 106, the method determines at step 108 whether the host vehicle 10 is making a lane change to a faster lane or to a slower lane based on the direction of the activated turn signal. For example, based on typical traffic flow convention, a left turn signal may indicate a lane change to a faster lane, while a right turn signal may indicate a lane change to a slower lane. In other embodiments, no assumption is made regarding a faster or slower lane based on the direction of the turn signal, and instead relies on observed characteristics of that lane (e.g., average vehicle speed of the lane over a certain period of time). Thus, the method may or may not apply step 108.

Proceeding from either step 106 or step 108, the method determines at step 110 whether there is a slower moving vehicle (i.e., relative to a current speed of the host vehicle 10) within a threshold distance from the host vehicle 10 in the desired adjacent lane. The desired adjacent lane is determined by the direction of the activated turn signal (i.e., left or right), and the relative speed between the host vehicle 10 and a potential target vehicle is determined by known methods using host vehicle sensors 18. The direction of the activated turn signal may be corroborated by checking an initial lateral movement of the host vehicle 10 in the same direction.

If there is no vehicle in the desired adjacent lane, or if a target vehicle in the desired adjacent lane is not traveling slower than the host vehicle 10 or is far enough forward of the host vehicle 10, then at step 112 the method determines if all conditions associated with a positive acceleration profile are satisfied. The positive acceleration profile includes a set of conditions based on various vehicle parameters. In one non-limiting example, the set of conditions for the positive acceleration profile include: 1) the turn signal indicator remains activated; 2) the host vehicle 10 has been following a target vehicle $T_A$ traveling in the same lane as the host vehicle 10 and the speed of the target vehicle $T_A$ is less than the driver-selected vehicle speed set-point; 3) the host vehicle speed is greater than a minimum host vehicle speed threshold, which in one non-limiting example may be approximately 50 mph; 4) there is no solid lane marking adjacent to the host vehicle 10 in the direction of the desired adjacent lane (indicating a no-passing zone); and 5) the target vehicle $T_A$ traveling in the same lane as the host vehicle 10 does not have a turn signal light (e.g., blinker) activated in the same direction as the desired adjacent lane, or if there is an active turn signal light in the same direction, the time period for which the turn signal light has been active is greater than a target vehicle turn signal threshold. When a turn signal light has been active for an extended period of time, the method assumes that the turn signal on the target vehicle $T_A$ was activated in error, or that the driver of the target vehicle $T_A$ has forgotten that the turn signal is active. In either scenario, the method assumes that the target vehicle $T_A$ does not intend to concurrently change lanes with the host vehicle 10. The activation of the turn signal light on a target vehicle $T_A$, among other environmental conditions and parameters, may be monitored according to known methods by the host vehicle sensors 18 and associated vehicle control modules. While the time period may vary, in one non-limiting example the target vehicle turn signal threshold may be between 10-15 seconds.

If at step 112 all of the conditions associated with the positive acceleration profile are not satisfied, then at step 114 the vehicle speed request is not modified in response to an anticipated lane change and the desired vehicle speed command is sent to ECM 16.

If at step 112 all of the conditions associated with the positive acceleration profile are satisfied, then at step 116, the method applies a supplemental speed request according to the positive acceleration profile. In one embodiment, the supplemental speed request relating to the positive acceleration profile is positive and increases the desired speed command prior to transmission to the ECM 16. By increasing the desired speed command, the host vehicle 10 speed is increased to mimic the actions of a human driver during a lane change. Stated another way, the supplemental speed request adjusts or modifies the desired vehicle speed command to form a modified desired speed command that is subsequently transmitted to the ECM 16. Therefore, in one embodiment, the modified desired speed command=the desired vehicle speed command+the supplemental speed request. As understood by those skilled in the art, the degree to which the desired speed command is modified by the supplemental speed request varies depending on the host vehicle specifications and the input conditions. In one non-limiting example, the supplemental speed request is calculated based on the current host vehicle 10 velocity and/or acceleration, distance and velocity and/or acceleration of the nearest target vehicle traveling in the desired adjacent lane. For example, if there is a target vehicle (e.g., $T_B$ or $T_C$) in the desired adjacent lane that is at a distance of approximately 40 m from the host vehicle 10, but the relative velocity between that target vehicle $T_B$ or $T_C$ and the host vehicle 10 is approximately 0 m/s, then the amount of acceleration requested in the supplemental request could be relatively low (e.g., around 0.5 m/s$^2$). However, if the target vehicle $T_B$ or $T_C$ is at a distance of approximately 40 m from the host vehicle 10, but the target vehicle $T_B$ or $T_C$ is traveling faster in that the relative velocity between that target vehicle $T_B$ or $T_C$ and the host vehicle 10 is approximately 2 m/s the amount of acceleration requested in the supplemental request could be higher (e.g., around 1-1.5 m/s$^2$). Similar determinations are made if the target vehicle $T_B$ or $T_C$ was approaching the host vehicle 10 from behind. The supplemental requests stay active for the entire period of lane change by the driver, but eventually fade out as the host vehicle 10 approaches the driver-selected vehicle speed set-point or the speed of a new target vehicle. As with the desired speed request, the supplemental speed request is continually updated to reflect changes in the host vehicle 10 environment, and in some instances, with every execution cycle of the adaptive cruise control processor.

At step 118, the method monitors for conditions that trigger a cancellation of the supplemental speed request associated with the positive acceleration profile implemented in step 116. In one embodiment, these conditions include: 1) any of the conditions for the positive acceleration profile in step 112 becoming "false;" 2) the time gap between the host vehicle and the target vehicle falls below a minimum threshold (e.g., 0.5 second headway); 3) the target vehicle brakes abruptly (e.g., significant drop in relative acceleration that violates a time-to-collision threshold); and 4) the turn signal indicator has been active for a time period that is greater than a host vehicle turn signal threshold. When the turn signal in the host vehicle has been active for an extended period of time, the method assumes that the turn signal was activated in error, or that the driver of the host vehicle 10 has forgotten that the turn signal is active. While the time period may vary, in one non-limiting example the host vehicle turn signal threshold may be between 10-15 seconds. If any of the conditions set forth above is "true," then the supplemental speed request relating to the positive acceleration profile is canceled at step 120.

In addition, if one of the conditions for the cancellation of the positive acceleration profile in step 118 is met, and before proceeding to step 120, the method determines if conditions associated with a transitional acceleration profile are satisfied at step 122. In one embodiment, the method determines if the cancellation in step 118 is in response to either: 1) the turn signal indicator being deactivated; or 2) the turn signal indicator being active for a time period that is greater than the host vehicle turn signal threshold. If either of these conditions is "true" than the method determines if the lane change by the host vehicle 10 is still in progress at step 124. This determination may be made by any method known to those having skill in the art, but in one embodiment may be determined by monitoring the distance to a lane marker, which would be decreasing at a consistent or monotonic rate.

If at step 124 the method determines that the lane change is no longer be in progress, then the supplemental speed request relating to the positive acceleration profile is canceled. If, however, the lane change is still in progress, the method at step 126 applies a transitional acceleration profile in which the supplemental speed request is maintained according to the positive acceleration profile.

At step 128, the method monitors for conditions that trigger a cancellation of the transitional acceleration profile. In one embodiment, these conditions include: 1) the lane change being completed; 2) the host vehicle 10 begins to follow a new target vehicle; 3) the time gap between the host vehicle and the target vehicle falls below a minimum threshold (e.g., 0.5 second headway); or 4) the target vehicle brakes abruptly (e.g., significant drop in relative acceleration that violates a time-to-collision threshold).

If any of the conditions for the cancellation of the transitional acceleration profile in step 126 are met, then the supplemental speed request relating to the transitional acceleration profile is canceled at step 130.

Referring back to either of steps 106 or 108, if the method determines that a target vehicle in the desired adjacent lane is traveling slower than the host vehicle 10, then at step 132 the method applies a supplemental speed request according to a negative acceleration profile. In one embodiment, the supplemental speed request relating to the negative acceleration profile is negative and decreases the desired speed command prior to transmission to the ECM 16. By decreasing the desired speed command, the host vehicle 10 speed is decreased to mimic the actions of a human driver during a lane change to a slower lane. As understood by those skilled in the art, the degree to which the desired speed command is modified by the supplemental speed request varies depending on the host vehicle specifications and the input conditions.

At step 134, the method monitors for conditions that trigger a cancellation of the request associated with the positive acceleration profile implemented in step 126. In one embodiment, these conditions include: 1) a velocity difference (ΔV) between the host vehicle 10 and a target vehicle in the desired adjacent lane becomes positive; or 2) the host vehicle 10 begins to follow a new target vehicle or the desired adjacent lane becomes open and free of other target vehicles.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for operating an autonomous or semi-autonomous host vehicle, the method comprising the steps of:
   receiving data measured from a plurality of sensors, wherein the measured data relates to one or more target vehicles in the host vehicle's field of view;
   calculating a desired speed command based on a driver-selected set-speed and the measured data;
   detecting initiation of a lane change by the host vehicle from a current lane to a desired adjacent lane;
   in response to initiation of the lane change, selecting an acceleration profile based on at least one set of operating conditions;
   calculating a modified speed command by adjusting the desired speed command according to the selected acceleration profile; and
   controlling a speed of the host vehicle based on the modified speed command.

2. The method of claim 1, wherein detecting initiation of the lane change is based on a turn signal activation of the host vehicle.

3. The method of claim 1, wherein selecting the acceleration profile includes determining whether a target vehicle is present in the desired adjacent lane and whether the target vehicle speed is less than a current speed of the host vehicle and within a threshold distance from the host vehicle.

4. The method of claim 3, wherein the desired adjacent lane is determined by a direction of the activated turn signal of the host vehicle.

5. The method of claim 1, wherein selecting the acceleration profile includes determining whether the desired adjacent lane is a faster lane or a slower lane relative to the current host vehicle speed.

6. The method of claim 1, wherein the acceleration profile includes a positive acceleration profile, a transitional acceleration profile, or a negative acceleration profile, wherein the positive acceleration profile and the transitional acceleration profile include a positive supplemental speed request that adjusts the desired speed command to increase the host vehicle speed, and the negative acceleration profile includes a negative supplemental speed request that adjusts the desired speed command to decrease the host vehicle speed.

7. The method of claim 1, wherein selecting the acceleration profile includes determining whether a first set of operating conditions relating to a positive acceleration profile are satisfied.

8. The method of claim 7, further including monitoring for conditions that trigger a cancelation of the positive acceleration profile.

9. The method of claim 8, wherein the conditions triggering the cancelation of the positive acceleration profile include at least one of the following conditions: at least one of the conditions in the first set of operating conditions is no longer satisfied; a time gap between the host vehicle and a target vehicle falls below a minimum threshold; a relative acceleration of the target vehicle with respect to the host vehicle is less than a threshold; and a turn signal indicator has been active for a time period that is greater than a turn signal threshold of the host vehicle.

10. The method of claim 8, wherein the conditions triggering the cancelation of the positive acceleration profile include at least one of the conditions in the first set of operating conditions being no longer satisfied.

11. The method of claim 8, wherein the conditions triggering the cancelation of the positive acceleration profile include a time gap between the host vehicle and a target vehicle falling below a minimum threshold.

12. The method of claim 8, wherein the conditions triggering the cancelation of the positive acceleration profile include a relative acceleration of the target vehicle with respect to the host vehicle being less than a threshold.

13. The method of claim 8, wherein the conditions triggering the cancelation of the positive acceleration profile include a turn signal indicator being active for a time period that is greater than a turn signal threshold of the host vehicle.

14. The method of claim 8, further including determining whether a third set of operating conditions relating to a transitional acceleration profile is satisfied in response to the cancelation of the positive acceleration profile.

15. The method of claim 14, wherein the third set of operating conditions include whether the host vehicle lane change is in progress in response to either the turn signal indicator being deactivated, or the turn signal indicator being active for a time period that is greater than a turn signal threshold of the host vehicle.

16. The method of claim 1, wherein selecting the acceleration profile includes determining whether a second set of operating conditions relating to a negative profile are satisfied.

17. The method of claim 16, wherein the second set of operating conditions include a target vehicle being present in the desired adjacent lane, and wherein the target vehicle speed in the desired adjacent lane is less than a current speed of the host vehicle and within a threshold distance from the host vehicle.

18. The method of claim 1, wherein the acceleration profile includes a positive or negative torque request.

19. A method for operating an autonomous or semi-autonomous host vehicle, the method comprising the steps of:
  receiving data measured from a plurality of sensors, wherein the measured data relates to one or more target vehicles in the host vehicle's field of view;
  receiving a desired speed command based on a driver-selected set-speed and the measured data;
  detecting a lane change by the host vehicle from a current lane to an adjacent lane based on an activation of a turn signal of the host vehicle;
  determining a relative speed between the host vehicle and a target vehicle in the adjacent lane;
  selecting a positive or a negative acceleration profile based on the relative speed and a plurality of operating conditions;
  calculating a modified speed command by adjusting the desired speed command according to the selected acceleration profile; and
  controlling a response of the host vehicle in an anticipatory manner that is designed to mimic a human driver's response based on the modified speed command.

20. A control system for a vehicle, the system comprising:
  a plurality of vehicle sensors configured to measure data relating to one or more target vehicles in the host vehicle's field of view; and
  an adaptive cruise control system configured to:
    receive the measured data relating to the one or more target vehicles;
    calculate a desired speed command based on a driver-selected set-speed and the measured data;
    detect initiation of a lane change by the host vehicle to a desired adjacent lane;
    in response to initiation of the lane change, select an acceleration profile based on at least one set of operating conditions;
    calculate a modified speed command by adjusting the desired speed command according to the selected acceleration profile; and
    control the host vehicle speed based on the modified speed command.

* * * * *